UNITED STATES PATENT OFFICE.

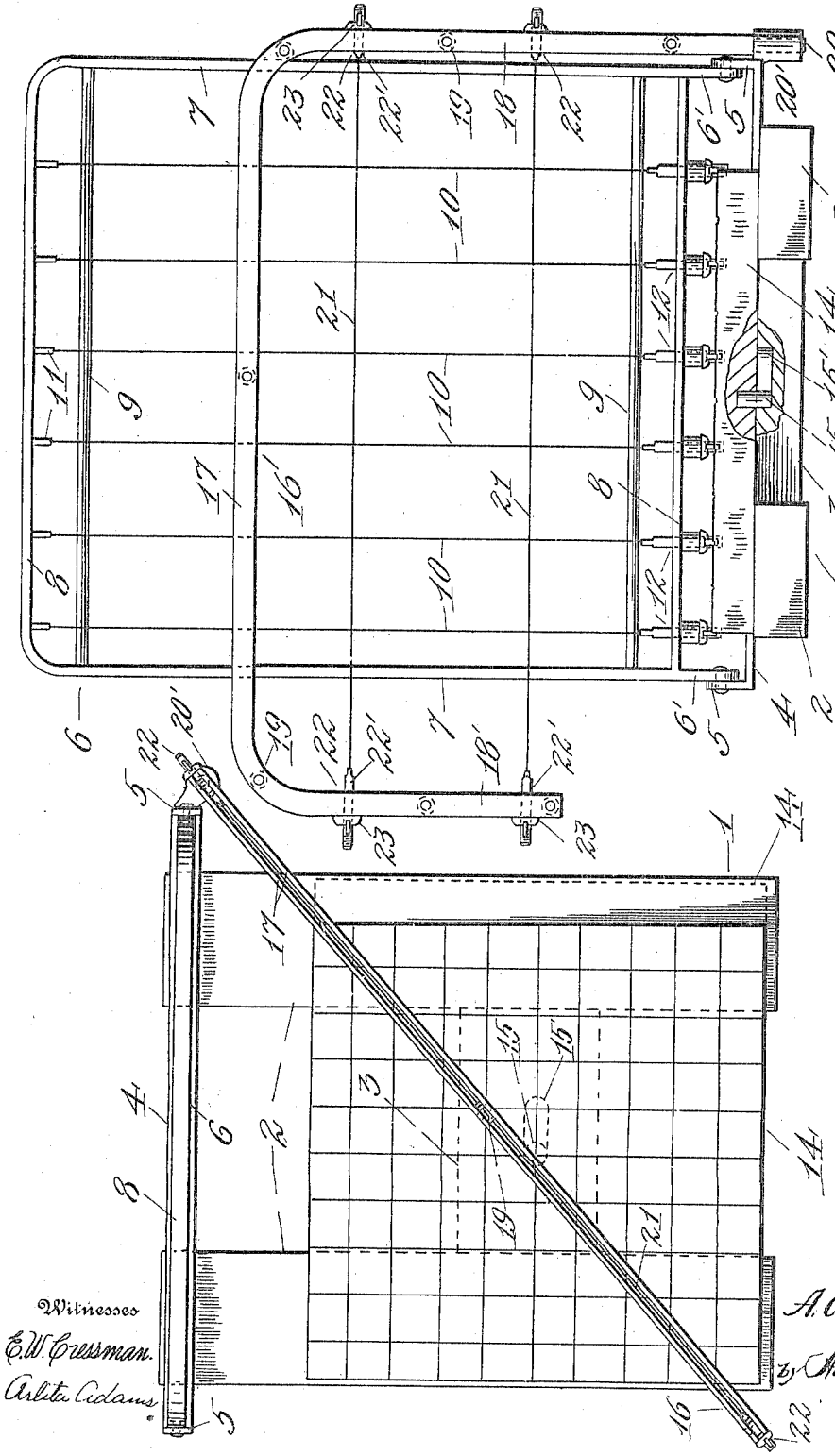

ARTHUR C. HUMMER, OF SEATTLE, WASHINGTON.

BUTTER-CUTTER.

No. 817,486.           Specification of Letters Patent.           Patented April 10, 1906.

Application filed December 14, 1905. Serial No. 291,784.

*To all whom it may concern:*

Be it known that I, ARTHUR C. HUMMER, a citizen of the United States of America, and a resident of the city of Seattle, in the county of King and State of Washington, have invented certain new and useful Improvements in Butter-Cutters, of which the following is a specification.

My invention relates to an improved apparatus for cutting bodies of butter, and has for its object to improve and simplify devices of the above type.

The invention resides in the novel construction, combination, and arrangement of parts, as hereinafter fully specified, and particularly pointed out in the claims.

In the accompanying drawings, Figure 1 is a plan view of my improved apparatus, showing the frame for making the horizontal cuts in operation; and Fig. 2 is a front elevation showing said frame in position after completing the horizontal cuts.

Referring to the drawings, 1 represents a suitable base conveniently consisting of opposite pieces 2, connected by a cross-piece 3 and having secured thereto at one end a tie 4, provided at the extremities with lugs 5 5.

Reference-numeral 6 indicates a frame having side pieces 7, end pieces 8, and cross-pieces 9, secured to the side pieces, the latter lying adjacent to and parallel with the end pieces. This frame is employed in making vertical cuts in the butter, it being pivotally connected with the base 1, so that it can be swung to and from the same, the said connection being conveniently made by means of lugs 6', secured to the lower end of the frame and engaging pivots seated in the lugs 5 5 of the base.

Extending between the end pieces of frame 6 are cutters 10 in the form of wires which are secured at one extremity to projections 11 of the upper end piece 8 and connected at the opposite extremity with suitable tension devices, as 12, seated on the lower end piece, the said wires passing in front of the cross-pieces 9 of the frame.

Reference-numeral 14 designates a platform suitably mounted on base 1, so that it may be rotated and also adjusted laterally with respect to the lines of cut of the cutters 10. As shown, the platform is provided with a pivot 15, which fits rotatably in an elongated recess 15', formed in the cross-piece 3 and extending transversely of base 1, whereby the said platform may be rotated and also adjusted laterally as aforesaid, the pivot 15 slidably fitting in recess 15' to permit of such adjustment.

To divide a body of butter by vertical cuts, the body is placed on platform 14 and the frame 6 swung downwardly to force the cutters 10 through the butter, and the cuts thus made divide the butter into parallel sections. The frame is then swung upwardly and the platform rotated a quarter of a turn, when the frame is again advanced to cause the cutters 10 to pass through the body of butter, thereby dividing the sections into blocks or bricks. If desired to divide the body of butter into blocks or bricks smaller than those obtained by the operation just described, the platform is shifted laterally, following the first operation of cutting, and the cutters again pass through the butter before rotating the same, thus producing a second series of cuts parallel with the first cuts. The platform is then rotated a quarter of a turn and the frame 6 advanced as before, after which the platform may be again shifted laterally and the cutter-frame 6 again advanced.

Reference-numeral 16 indicates a cutter-frame employed for horizontal cutting, the same comprising opposite members each consisting of a cross-piece 17 and downwardly-extending end pieces 18 and 18'. The two members are spaced apart by suitable means, as washers 19, and rigidly connected together by suitable means, as rivets or the like. Secured to the lower extremities of end pieces 18 is a pivot 20, which fits rotatably and removably in a socket-piece, as 20', which is secured to base 1 and located at a convenient point to permit of the swinging of frame 16 across the face of platfrom 14.

21 designates cutters in the form of wires connected with the end portions of frame 16 and arranged one above the other, the same being secured to suitable tension devices, as 22, consisting of screw-threaded stems 22', fitting slidably between the opposite members of the frame, and thumb-nuts 23, engaged with said stems and bearing against the outer edges of their respective end portions of the frame. These cutters may be adjusted vertically by loosening the thumb-nuts and sliding the stems 22' upwardly or downwardly. Thus the cutters can be adjusted to produce horizontal cuts in the body of butter at predetermined points above the platform.

To operate upon a body of butter requiring horizontal division, the cutters 21 are adjusted vertically to the proper positions to divide the butter into layers of the desired thickness, and the frame 16 is then swung across the face of the platform to pass the cutters through the butter.

When it is desired to divide the body of butter by vertical cuts, the frame 16 is swung from the field of action of the frame 6.

Having thus described my invention, what I claim as new, and desire to secure by Letters Patent of the United States of America, is—

1. A butter-cutter comprising means for supporting a body of butter for rotation and adjustment laterally relatively to its axis, and a cutter movable into the butter for producing a cut at an angle to the line of adjustment of the butter.

2. A butter-cutter comprising a rotatable means for supporting a body of butter, and a cutting means movable into the butter for producing a cut, one of said means being adjustable laterally relatively to the axis of the body of butter, whereby said cutting means can be moved into the body of butter to make a second cut parallel with the first cut.

3. A butter-cutter comprising a means for supporting a body of butter, and a cutter movable toward and from the same, said means being mounted for rotation and bodily adjustment laterally of said cutter.

4. A butter-cutter comprising a movable frame, cutters spaced apart on the frame, and means for supporting a body of butter for rotation and adjustment laterally of said frame.

5. A butter-cutter comprising a base having an elongated recess, a rotatable platform having its pivot engaged in said recess of the base, and a cutter movable toward and from said platform.

Signed at Seattle, Washington, this 7th day of December, 1905.

ARTHUR C. HUMMER.

Witnesses:
L. FRANK BROWN,
M. P. TREGONING.